US010674267B1

(12) United States Patent
Guidetti et al.

(10) Patent No.: US 10,674,267 B1
(45) Date of Patent: Jun. 2, 2020

(54) PHYSICAL FEEDBACK IN VEHICLES

(71) Applicant: SUBPAC, INC., San Francisco, CA (US)

(72) Inventors: Louis-Pierre Guidetti, Los Angeles, CA (US); Sarosh Khwaja, Palo Alto, CA (US); Todd Chernecki, Palo Alto, CA (US)

(73) Assignee: SUBPAC, INC., San Francisco, CA (US)

( * ) Notice: Subject to any disclaimer, the term of this patent is extended or adjusted under 35 U.S.C. 154(b) by 0 days.

(21) Appl. No.: 16/534,845

(22) Filed: Aug. 7, 2019

(51) Int. Cl.
*H04R 1/02* (2006.01)
*H04R 3/12* (2006.01)
*B60N 2/90* (2018.01)
*B60N 2/00* (2006.01)
*H04R 3/04* (2006.01)
*H04R 1/40* (2006.01)
*B60Q 9/00* (2006.01)

(52) U.S. Cl.
CPC .............. *H04R 3/12* (2013.01); *B60N 2/002* (2013.01); *B60N 2/90* (2018.02); *H04R 1/025* (2013.01); *H04R 1/403* (2013.01); *H04R 3/04* (2013.01); *B60N 2002/981* (2018.02); *B60Q 9/008* (2013.01); *H04R 2400/03* (2013.01); *H04R 2499/13* (2013.01)

(58) Field of Classification Search
CPC ... H04R 1/02; H04R 1/04; H04R 3/04; H04R 1/2896; G06F 3/016; B60W 50/16

USPC .......................................................... 381/86
See application file for complete search history.

(56) References Cited

U.S. PATENT DOCUMENTS

| 10,232,773 | B2 | 3/2019 | Modarres et al. | |
| 10,457,179 | B1* | 10/2019 | Kentley-Klay | B60N 2/879 |
| 2017/0325039 | A1* | 11/2017 | Khwaja | H04R 29/00 |
| 2019/0300020 | A1* | 10/2019 | Alexiou | G05B 9/00 |

FOREIGN PATENT DOCUMENTS

| WO | 2017196666 A1 | 11/2017 |
| WO | 2018027168 A1 | 2/2018 |

* cited by examiner

*Primary Examiner* — Melur Ramakrishnaiah
(74) *Attorney, Agent, or Firm* — Maschoff Brennan

(57) ABSTRACT

A method may include monitoring a sensor associated with a first location of an automobile seat, where the first location corresponds to a first transducer embedded within the automobile seat, and the automobile seat includes a second transducer at a second location within the automobile seat. The first and the second transducers may be configured to generate tactile feedback upon receiving an activating signal. The method may also include detecting an event triggering the activating signal to be sent to the first transducer, and based on a reading from the sensor indicating that an occupant of the automobile seat is not in contact with the first location, modifying the activating signal such that the first transducer primarily produces an audible sound rather than tactile feedback.

20 Claims, 12 Drawing Sheets

PHYSICAL FEEDBACK IN VEHICLES

FIELD

The application relates generally to contextualized equalization, and also generally relates to vehicle alerts.

BACKGROUND

For hundreds of years, people have enjoyed music, both playing music and listening to music. In recent years, the types of music available for listening has expanded exponentially, as has the equipment by which the user may listen to music. Often, the equipment by which a user may hear, or listen to, music may be located in the same room where the user is located and the playback of music may be controlled by the user.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a method that includes receiving a reading from a pressure sensor disposed within an object in contact with a body of a user, where the pressure sensor includes a force sensitive resistor (FSR) in series with a constant resistor. The object may host a transducer that is configured to provide vibrotactile sensations to the body of the user. The method may also include, using the reading from the pressure sensor, computing an amount of pressure exerted on the object by the body of the user. The method may additionally include comparing the amount of pressure to a pressure threshold data structure to determine a transducer system state associated with the transducer. The method may also include performing equalization processing on an output signal used by the transducer, where the equalization processing is specific to the transducer system state.

One or more embodiments of the present disclosure may include a method that includes monitoring a sensor associated with a first location of an automobile seat, where the first location corresponds to a first transducer embedded within the automobile seat, and the automobile seat includes a second transducer at a second location within the automobile seat. The first and the second transducers may be configured to generate tactile feedback upon receiving an activating signal. The method may also include detecting an event triggering the activating signal to be sent to the first transducer, and based on a reading from the sensor indicating that an occupant of the automobile seat is not in contact with the first location, modifying the activating signal such that the first transducer primarily produces an audible sound rather than tactile feedback.

The object and advantages of the embodiments will be realized and achieved at least by the elements, features, and combinations particularly pointed out in the claims. It is to be understood that both the foregoing general description and the following detailed description are exemplary and explanatory and are not restrictive of the present disclosure, as claimed.

BRIEF DESCRIPTION OF THE DRAWINGS

Example embodiments will be described and explained with additional specificity and detail through the use of the accompanying drawings in which.

Figure 1:
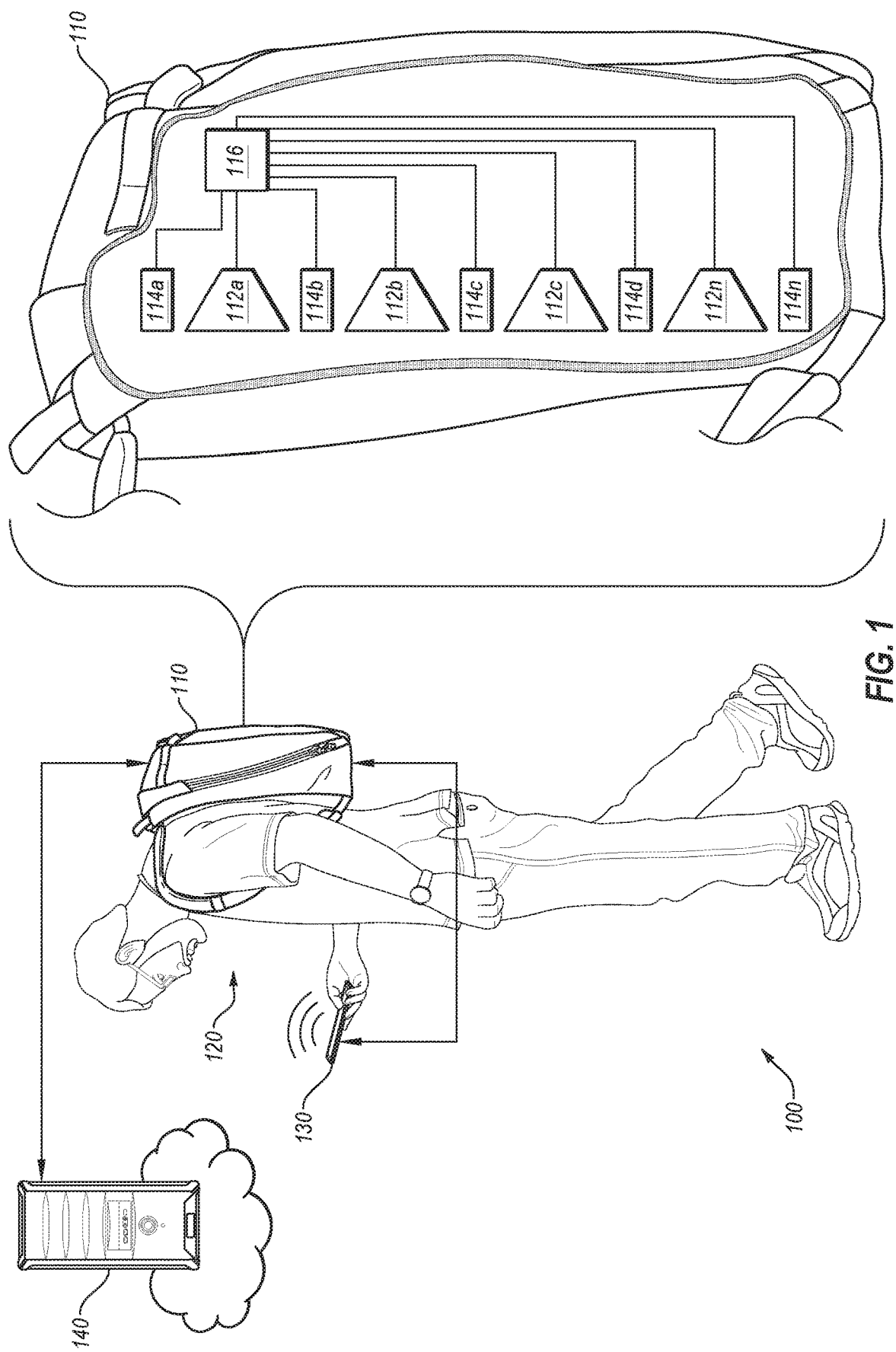
FIG. 1 illustrates an example system associated with providing contextual equalization.

all in accordance with at least one embodiment described in the present disclosure.

DESCRIPTION OF EMBODIMENTS

Listening to an audio piece, such as a music track, may be one aspect of an audio experience for a user. Feeling the audio piece may be another aspect of the audio experience for the user. Embodiments of the present disclosure may relate to the generation of vibrations (which may be referred to as tactile or vibrotactile sensations) associated with an audio piece or other sounds/alerts. The generation of such a tactile sensation may allow the user to feel a physical dimension of the sound they hear, which may result in an immersive experience for both acoustic perception and tactile perception of the user.

In some embodiments, the setting in which a transducer generating the vibrations is operating can have a large impact on the performance of the transducer. For example, interactions of the body of a user with the transducer may vary a transducer system state such that the transducer may perform significantly differently depending on which of multiple transducer system states the transducer and/or the associated system is operating. For example, if the user is exerting a large force against the transducer (e.g., the user is sitting atop an object housing the transducer), the performance of the transducer may be significantly different than if the transducer is embedded in the back of a seat against which the user is leaning. By determining a transducer system state associated with the transducer, a specific equalization curve may be applied to the transducer such that the user may enjoy a consistent tactile experience regardless of the state of the transducer. Additionally, that principle may be extrapolated to multiple transducers in an object that has multiple transducers such that the transducer system state associated with each transducer may be determined and each transducer may be provided with specific equalization specific to the transducer system state of each individual transducer such that the transducers together provide a consistent experience to the user. In some embodiments, the transducer system state includes not only an operating condition/set of properties of the transducer itself, but also of the surroundings in which the transducer is operating and/or the interactions between the surroundings and the transducer. Thus, determining the transducer system state of the transducer may include a state of the entire object within which the transducer is operating, the transducer, and an item, person, etc. imposing pressure or force on the object within which the transducer is operating. In some embodiments, a pressure sensor using a constant resistor and one or more variable resistors may be used to facilitate approximation of the pressure experienced by the transducer, and that information may be used to determine a transducer system state associated with the transducer. The transducer system state may facilitate a determination of which type of equalization to apply to the signal received by the transducer. In some circumstances, the transducer system state associated with the transducer may be monitored in real time such that the equalization applied can be modified in real time.

In some embodiments, the pressure sensors and/or the transducer system state associated with the transducers may be used to determine whether or not an occupant of a seat is in contact with the seat at the location of a given transducer. If the user is not in contact with the seat at the location of the transducer, the signal activating the transducer may be modified. For example, if the user is not in contact with the seat the signal may be modified so that the transducer generates an audible sound rather than a tactile sensation, although still originating at the same location via the same transducer.

These and other embodiments are described with reference to the appended figures. In the appended figures, features and components with like item numbers indicate similar structure and function unless described otherwise. The appended figures are not necessarily to scale.

FIG. 1 illustrates an example system 100 associated with providing contextual equalization, in accordance with one or more embodiments of the present disclosure. The system 100 may include an object 110 against a body of a user 120. The object 110 may include one or more transducers 112 to provide tactile sensations to the user 120. For example, audio from a mobile device 130 of the user 120 and/or audio from a server 140 may be played to the user 120 while the user 120 enjoys corresponding tactile sensations from the object 110 that correspond to the audio. In these and other embodiments, a processor 116 associated with the object 110 may perform equalization or other processing on activating signals that cause the transducers 112 to generate the tactile sensations. For example, the processor 116 may use information from one or more pressure sensors 114 to determine what type of equalization or other processing to perform on the activating signals.

The object 110 may include any object that includes one or more transducers 112 (such as the transducers 112a-112n) to provide tactile sensations to the user 120. For example, the object 110 may include a backpack, vest, body suit, garment, piece of clothing, or other wearable apparatus or device that places the object in contact with the body of the user 120. As another example, the object 110 may include a seat, such as an automotive seat, a movie theater seat, etc. As an additional example, the object 110 may include a pad or attachment that rests atop an existing seat or chair.

In some embodiments, a back region of the object 110 may include a primary membrane that is configured to be positioned adjacent the body of the user 120 and a secondary membrane that is adjacent to the primary membrane. In some embodiments, the primary membrane and the secondary membrane may be implemented as a single membrane. The primary membrane may be a large, rigid membrane and may be made of any of a number of thermoplastics, such as polypropylene, high density polyethylene (HDPE), polyvinyl chloride (PVC), and the like, or of composite materials, such as carbon-fiber. This secondary membrane may be a microcellular polymer membrane made of microcellular elastomers (EVA), urethanes (PU), rubbers, and the like; but otherwise may include microcellular polyurethane, which has a great dampening effect on vibrations. The secondary membrane may have less surface area than the primary membrane.

The transducers 112 may be directly attached to the secondary membrane or the transducer transducers 112 may be embedded in the secondary membrane. In some embodiments, the transducers 112 may include a magnet that moves back and forth and thereby may generate vibrations. When the magnet moves back and forth, it may create a vibration that the user 120 may feel. The vibrations may be dampened by the secondary membrane and may be dissipated across a surface area of the secondary membrane. The primary membrane may be engaged with the secondary membrane such that the primary membrane may collect the vibrations from the secondary membrane and may transfer the vibrations to the body of the user 120. The primary membrane may include a large, rigid membrane that has approximately the same surface area as a region of the object 110 proximal to the body of the user 120. The vibrations may be transferred to the body of the user 120 and produce visceral sensations in the body of the user 120. These visceral sensations that may be experienced by the user 120 may cause the user 120 to feel music or other sounds through the body of the user 120. In some embodiments, each transducer 112 may have its own primary and/or secondary membrane or may share its primary and/or secondary membrane with one or more additional transducers 112.

In some embodiments, the transducers 112 may be embedded within the object 110 such that one or more surfaces or membranes of the object 110 may convey the vibrations generated by the transducers 112 to the user 120 such that the user 120 enjoys the tactile sensations generated by the object 110. For example, the transducers 112 may receive an activating signal causing the transducers 112 to vibrate or an output signal, such as from an audio device, to activate the transducers 112. The vibrating transducers 112 may convey those vibrations to a membrane that interfaces with the body of the user 120.

In some embodiments, the object 110 may include a processor 116 that may control operation of the object 110. For example, the processor 116 may facilitate communication of the object 110 with the mobile device 130 to receive audio data or other data (e.g., alerts, vibration tracks, etc.) to be conveyed to the user 120 via vibrations. As another example, the processor 116 may facilitate communication of the object 110 with the remote computing device 140 to receive audio data or other data (e.g., alerts, vibration tracks, etc.) to be conveyed to the user 120 via vibrations. As an additional example, the processor 116 may perform filtering, processing, equalization, personalization, customization, etc. of an output signal to be provided to the transducers 112.

In some embodiments, the transducers 112 may include any device, component, or system configured to generate vibrations for the user 120. For example, the transducers 112 may include any of tactile transducers, exciters, piezoelectric actuators, piston drivers, or any other mechanism that translates an electric signal such as the activating signal or an output signal into motion.

In some embodiments, the object 110 may include one or more pressure sensors 114 (such as the pressure sensors 114a-114n). In some embodiments, the pressure sensors 114 may be individual pressure sensors that provide individual pressure readings at each of the locations of the pressure sensors 114. Additionally or alternatively, the pressure sensors 114 may operate cooperatively to provide an overall pressure reading for the entire object 110. For example, the pressure sensors 114 may facilitate determination of the pressure exerted by the body of the user 120 against the object 110. Additionally or alternatively, multiple pressure sensors 114 may operate in conjunction for a particular transducer 112. For example, the pressure sensors 114a and 114b may operate in conjunction to provide the amount of pressure experienced at the transducer 112a, and/or the pressure sensors 114b and 114c may operate in conjunction to provide the amount of pressure experienced at the transducer 112b. In these and other embodiments, the pressure sensors 114a and 114b may be in a combined circuit (e.g., wired in parallel and/or in series) or may be in separate electrical circuits and operated independently.

The performance of the transducer 112 may be impacted by a transducer system state. The transducer system state associated with the transducer 112 may be based on the system and surroundings in which the transducer 112 is used. For example, if the material of which the object 110 is made is compressed (e.g., if foam from a seat is compressed from the user 120 sitting against the seat), the performance of the transducer 112 may change. By determining the pressure exerted by the body of the user 120 against the object 110, a transducer system state associated with the transducer 112 may be determined.

In some embodiments, an output signal that drives the transducer 112 may undergo equalization to change the amplitude of certain frequency ranges reproduced by the transducer 112. The equalization curve may be modified based on the transducer system state. For example, in certain states, certain frequencies may be desirably amplified or diminished. In some embodiments, a pressure threshold data structure may be used such that a given pressure value may be compared to the pressure threshold data structure to determine a transducer system state that corresponds to the given pressure value, and/or an associated equalization process to be performed based on the determined state.

In some embodiments, each transducer 112 of multiple transducers 112a-112n may have an individual transducer system state determined, and each may have a corresponding equalization curve applied to an output signal for the corresponding transducer 112. In these and other embodiments, despite changing the transducer system state associated with the transducers 112 based on different contextual settings for the transducers 112 (e.g., the transducers corresponding to the small of the back of the user 120 may have less pressure exerted than the transducers corresponding to the shoulder blades of the user 120). By applying different equalization curves to the different transducers 112a-112n based on the different transducer system states, the user 120 may experience a consistent tactile experience despite the variations in the surroundings of the different transducers 112a-112n.

In some embodiments, the output signal may be based on an audio source that is providing audio to which the user 120 is listening. For example, the user 120 may be playing audio from the mobile device 130 and listening via headphones while also experiencing tactile sensations associated with the audio as provided to the user 120 via the transducers 112 in the object 110. As another example, the user 120 may be playing audio from the remote computing device 140 such as a cloud-based or streaming music service. In these and other embodiments, one or more components of the audio signal may be provided to the object 110 as an output signal. For example, the output signal may be a certain frequency range of the audio signal (such as the frequencies between 10 and 250 Hz). As another example, a certain channel of audio data may be designated as tactile signal, similar to how a certain portion of an audio signal may be provided to left or right speakers. In some embodiments, the entire audio signal may be provided to the processor 116 and the processor 116 may select out the components of the audio signal to provide to the transducers 112 as an output signal. For example, the processor may filter out a certain range of frequencies etc.

In some embodiments, the pressure readings from the object 110 may be used for one or more other purposes, such as determining a breathing rate of the user 120. An example of such operations are described with greater detail with reference to FIGS. 8-10. Additionally or alternatively, the system 100 may utilize the pressure readings from the object 110 to determine a posture of the user 120 and provide an alert to the user 120 accordingly. An example of such operations are described with greater detail in FIG. 12.

Modifications, additions, or omissions may be made to the system 100 without departing from the scope of the present disclosure. For example, the system 100 may include any number of transducers 112 and/or pressure sensors 114. As another example, the object 110 may take any shape or form configured to experience pressure due to contact between the user 120 and the object 110 such that the object 110 is able to convey tactile sensations to the user 120. As an additional example, the pressure sensors 114 may be disposed in any pattern and any location throughout the object 110.

Figure 2:
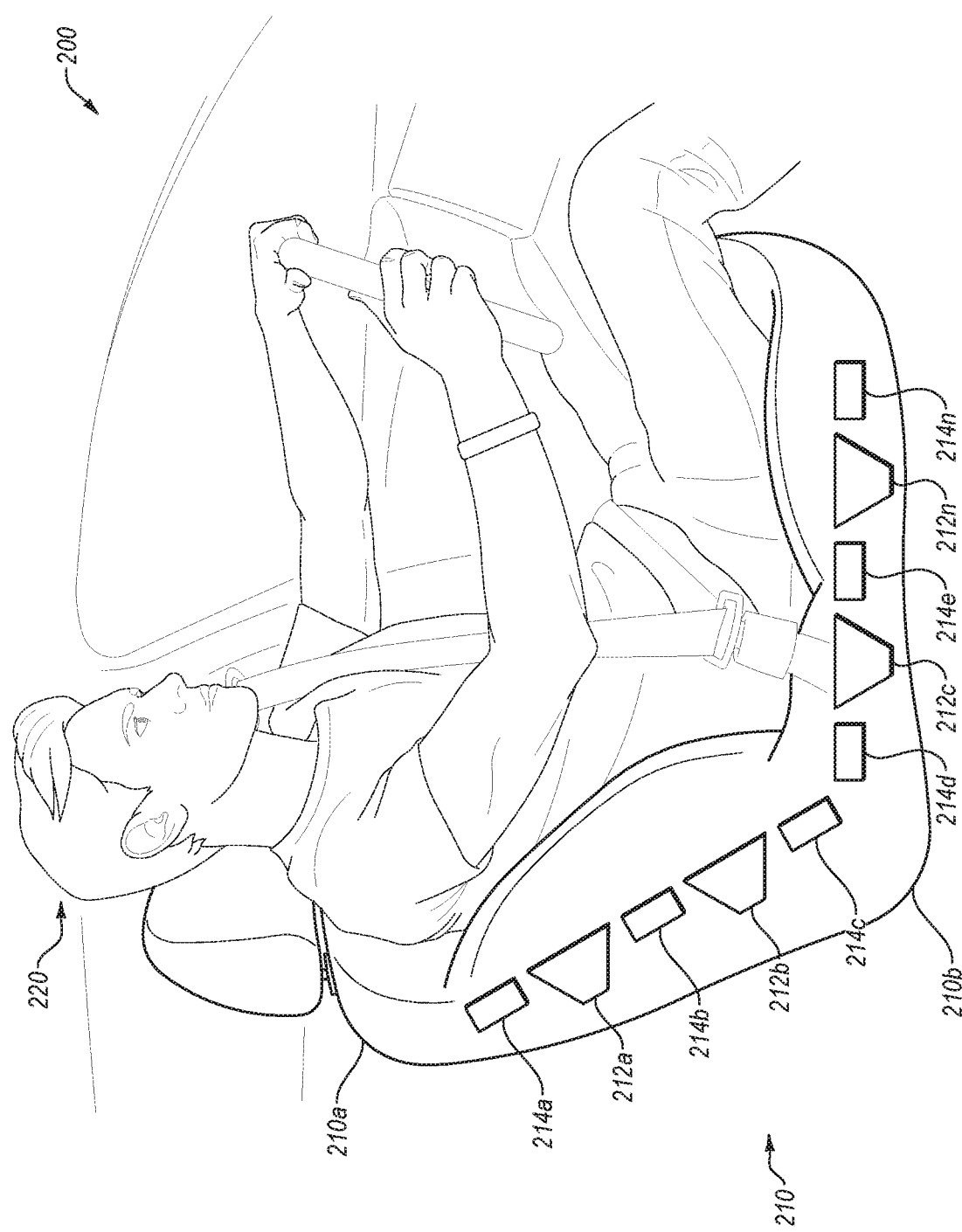
FIG. 2 illustrates an example vehicle associated with providing contextual equalization.

FIG. 2 illustrates an example vehicle 200 associated with providing contextual equalization, in accordance with one or more embodiments of the present disclosure. The vehicle 200 may illustrate one example implementation of the system 100 of FIG. 1. For example, the automobile seat 210 may correspond to the object 110 of FIG. 1. The automobile seat 210 may include transducers 212 (such as the transducers 212a-212n) and pressure sensors 214 (such as the pressure sensors 214a-214n) which may be similar or comparable to the transducers 112 and the pressure sensors 114, respectively. The automobile seat 210 may include a back portion 210a and a seat portion 210b. The user 220 may be similar or comparable to the user 120 of FIG. 1.

In operation, the transducers 212 may be configured to provide tactile sensations to the user 220. The user 220 may be driving the vehicle 200, or may be a passenger within the vehicle 200. In some embodiments, the transducers 212 may be utilized to enhance the listening experience of the user 220 when listening to audio in the vehicle 200 by receiving an output signal related to the listening experience of the user. Additionally or alternatively, the transducers 212 may be configured to provide an alert or tactile feedback to the user 220 by receiving activating signal that activates the transducers 212. In some embodiments, such alerts may be beneficial when driving as the alert may be provided to the user 220 rather than all occupants of the vehicle 200.

In some embodiments an alert to the user 200 may be triggered by a triggering event that causes an activating signal to be sent to one or more of the transducers 212. For example, a blind spot warning, a lane departure warning, a low fuel alert, a collision warning, a vehicle passing warning, a door ajar signal, a seatbelt warning, a driver-attention warning, an emergency vehicle warning, an arrival at location signal, a drop-off signal, a pick-up signal, etc., including any other alerts from an advanced driver-assistance system (ADAS). In some embodiments, such a triggering event may have a directionality component associated with the event. For example, a lane departure warning may be associated with a particular side of the vehicle 200 along which the vehicle 200 is departing from a lane. As another example, a door ajar signal may be associated with a rear right direction associated with a back passenger door being ajar. As an additional example, a pick-up signal may alert the user 220 that a ride-sharing individual is on their left to be picked up. In these and other embodiments, the alert may be provided to specific transducers 212 based on the directionality component of the triggering event. Following the examples above, the lane departure warning for the vehicle 200 departing the lane on the right may cause an activating signal to be sent to one or more of the transducers 212 along a right side of the automobile seat 210. Continuing the second example above, the door ajar signal for the back passenger door being ajar may cause an activating signal to be sent to the transducers in the left and back-most regions of the automobile seat 210. Continuing the third example above, the pick-up alert may trigger activating signals to be sent to the transducers along the left side of the automobile seat 210.

In some embodiments, readings from the pressure sensors 214 may indicate that a transducer system state associated with a given transducer corresponds to a transducer system state in which the user 220 is not sitting against a particular transducer 212 (such as the transducer 212a). While described as the user 220 sitting or not sitting against the transducer 212, it will be appreciated that the transducer 212 may be embedded within the seat and the reference to sitting against a particular transducer or being in contact with a particular transducer may also refer to being in physical contact with the surface of the automobile seat 210 beneath which the transducer 212 is located. In these and other embodiments in which the user 220 is not sitting against the transducer 212a, the activating signal being used to trigger the transducer 212a may be modified such that the transducer 212a may generate an audible signal instead of or in addition to the tactile sensation normally generated by the transducer 212a. For example, certain filtering or other signal processing may be performed on the activating signal such that the transducer 212a produces an audible sound to the user 220. By providing the signal to the same transducer and changing the modality to include audible sound, the directionality of the alert may be maintained. In embodiments in which the triggering even cause an activating signal to be sent to multiple transducers 212, the modification to include the audible sound may be performed on a per-transducer 212 basis, or may be performed such that all of the transducers 212 produce the audible sound. An example of such modification may be described in greater detail with reference to FIG. 12.

In some embodiments, when modifying the activating signal, the activating signal may cause only or primarily tactile sensations to be generated, only or primarily audible sounds to be generated, or combinations of both tactile and audible sounds. When referencing that a signal produces "primarily" audible sounds or "primarily" tactile sensations, greater than half of the energy consumed by the transducer may be used to generate the particular output, such as audible sounds or tactile sensations.

In some embodiments, the transducers 212 and/or the pressure sensors 214 may be disposed throughout the automobile seat 210. For example, the automobile seat 210 may include a foam cushion and the transducers 212 and the pressure sensors 214 may be disposed throughout the foam cushion. In some embodiments, the transducers 212 and/or the pressure sensors 214 may be uniformly distributed about a cross section of the automobile seat 210 (e.g., the transducers 212 and/or the pressure sensors 214 may be at a consistent depth in the foam). Additionally or alternatively, the transducers 212 and/or the pressure sensors 214 may be at various depths and/or may be distributed in a non-uniform manner. For example, the transducers 212 may be in a pattern about the back portion 210a and the seat portion 210b, and the pressure sensors 214 may be distributed about a corresponding transducer 212 for which the pressure sensors 214 are used to facilitate determination of the transducer system state.

Modifications, additions, or omissions may be made to the vehicle 200 without departing from the scope of the present disclosure. For example, the vehicle 200 may include any number of seats with any number of transducers. For example, each seat in the vehicle may have its own set of transducers such that the different seat occupants may receive personalized signals from the transducers.

Figure 3:
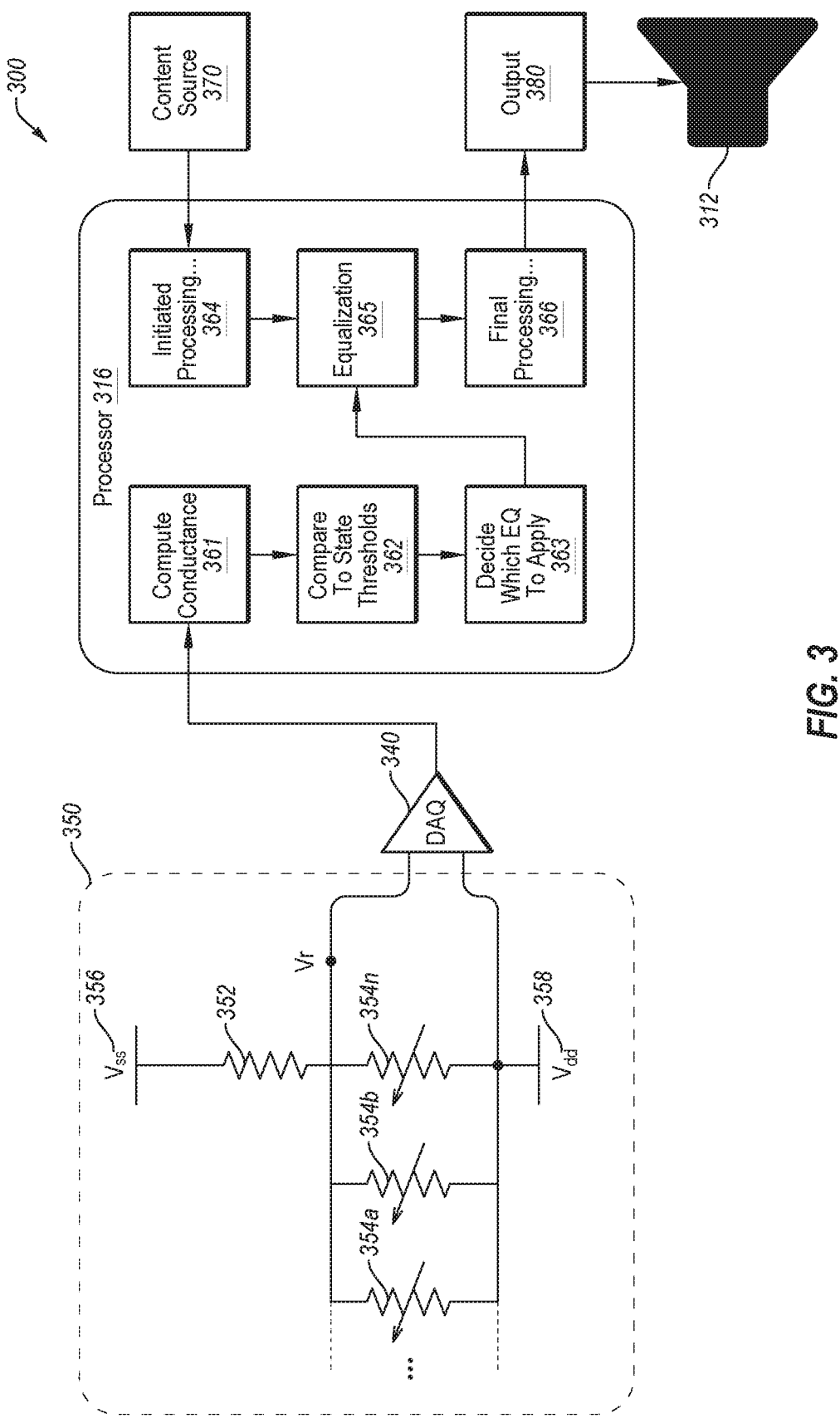
FIG. 3 illustrates an example system associated with providing contextual equalization.

FIG. 3 illustrates an example system 300 associated with providing contextual equalization, in accordance with one or more embodiments of the present disclosure. The system 300 may include a processor 316 to perform processing on various signals (such as a content source 370 signal), in order to generate an output 380 that is provided to a transducer 312. The processor 316 may additionally or alternatively facilitate determination of which equalization to apply to the content source 370 signal based on information from a pressure sensor 350.

The pressure sensor 350 may include any component or device configured to measure an amount of pressure experienced by the pressure sensor 350. One implementation of the pressure sensor 350 as illustrated in FIG. 3 includes one or more resistors used to determine the amount of pressure. The pressure sensor 350 may include a constant resistor 352 that may have a set resistance (e.g., a 100 kΩ resistor). The constant resistor 352 may be wired in series with one or more variable resistors 354 that are wired in parallel. For example, a ground voltage 356 may be located at one end of a circuit and be directly connected to the constant resistor 352. Next in the circuit may be the variable resistors 354a, 354b, and 354n wired in parallel and coupled to a positive/constant voltage source 358. The circuit between the constant resistor 352 and the variables resistors 354, labeled as $V_r$, may provide one input to a data acquisition component (DAQ) 340. The positive/constant voltage source 358 may be provided to the DAQ 340 as another input. In these and other embodiments, the DAQ 340 may compare the voltage of the two inputs and may output a digital signal representative of the difference between the two voltages.

The variable resistors 354 may include any type of resistor that varies based on experienced force. For example, the variable resistors 354 may be force sensitive resistors (FSRs). The variable resistors 354 may be located at various locations within a region for which the pressure may be analyzed together as a single value. For example, if a single transducer 312 is used, all of the variable resistors 354 in the object may functionally act as a single resistor in the circuit of the pressure sensor 350, thereby permitting the pressure from multiple locations (the locations of the variable resistors 354) to be determined and represented as a single pressure value.

In some embodiments, multiple pressure sensors 350 may be located at multiple locations in an object, and each of the pressure sensors 350 may include multiple variable resistors 354 that correspond to the respective pressure sensors 350. In these and other embodiments, one or more of the pressure sensors 350 may correlate with a transducer 312, and each transducer 312 may have a corresponding transducer system state that may be determined based on the sensed pressure.

In some embodiments, the variable resistors 354 may be embedded or otherwise disposed within the material of the object within which the transducer 312 is disposed. For example, if the object is an automobile seat, the transducer 312 may be disposed within the foam or other material of the automobile seat, and the variable resistors 354 may also be disposed within the foam or other material of the automobile seat.

As illustrated in FIG. 3, the processor 316 may perform various operations, examples of which are illustrated by the blocks 361-366, as explained herein.

The block 361 may refer to the processor 316 computing the conductance and/or resistance of the variable resistors 354. Because the variable resistors 354a-n are wired in parallel, they may be treated as a single resistor in calculating conductance and/or resistance. For example, the conductance and/or resistance may be computed based on the equation of $$V_r = V_{dd}\left(\frac{R_{352}}{(R_{354a} + R_{354b} + \ldots + R_{354n}) + R_{352}}\right)$$

and solving for the summation of the variable resistors, where $V_{dd}$ may represent the source voltage or positive terminal, $V_r$ may represent the voltage between the variable resistors 354 and the constant resistor 352, 8352 may represent the resistance of the constant resistor 352, and $R_{354a}$, $R_{354b}$, and $R_{354n}$ may represent the resistance of the variable resistors 354a-n, respectively. The conductance of the summation of the variable resistors 354a-n may be represented by the inverse of their associated resistance. In some embodiments, the determined conductance and/or resistance of the variable resistors may be correlated with an amount of pressure. For example, a lookup table or other set of values may be maintained by the processor 316 as a pressure threshold data structure that may facilitate the identification of an amount of pressure.

The block 362 may represent the comparison of the determined conductance (and/or resistance) to a pressure threshold data structure. For example, the pressure threshold data structure may include a table with a series of ranges of conductance and/or resistance and/or corresponding pressures that are proportional to the measured conductance and/or resistance of the variable resistors 354. The pressure threshold data structure may include various transducer system states associated with the transducer corresponding to the ranges of pressure and/or conductance/resistance such that for a determined pressure and/or conductance/resistance, the transducer system state may be determined.

The block 363 may represent the processor 316 determining which equalization to apply to the output signal provided to the transducer 312. For example, the processor 316 may look up the pressure threshold data structure to identify a corresponding equalization curve to apply to the output signal based on the transducer system state associated with the transducer 312.

In some embodiments, the corresponding equalization curves may be personalized or customized. For example, a default equalization curve may be included as corresponding to a given transducer system state associated with the transducer 312. When in the given transducer system state, the user of the object may adjust the equalization of the output signal to modify the tactile sensations experienced by the user. In these and other embodiments, the processor 316 may store the modified equalization curve as an updated equalization curve corresponding to the current transducer system state associated with the transducer 312 such that as the transducer 312 is found to be in the same transducer system state at some point in the future, the modified equalization curve may be applied to the output signal rather than the default equalization curve.

In some embodiments, a continuous transition between states may be provided. For example, a function may be applied to the pressure and/or conductance/resistance such that a linear or logarithmic correlation may be applied between amplitude values and pressure and/or conductance/resistance values to be applied to the output signal. In these and other embodiments, rather than a discrete jump in equalization curves from one transducer system state to another, there may be variations between different values within a same transducer system state.

The block 364 may represent the processor 316 performing initial processing on the content source 370. For example, the content source 370 may include an audio signal and the low frequencies of the audio signal may be extracted. As another example, the content source 370 may include a track dedicated to tactile sensations. The initial processing 364 may include personalization of the signal, for example, as described in U.S. application Ser. No. 16/267,211, which is hereby incorporated by reference in its entirety.

The block 365 may represent the processor 316 applying the equalization curve determined at the block 363 to the output signal to be provided to the transducer 312. For example, certain frequencies may be amplified and others may be diminished in amounts that are based on the transducer system state associated with the transducer 312.

The block 366 may represent any final processing that the processor 316 may perform on the output signal prior to sending the output signal to the transducer 312. Such processing may include filtering, general amplification, normalization, transient shaping, compression, reverberation, subharmonic generation, etc.

The output 380 may represent the signal that is output by the processor 316 to activate the transducer 312. For example, the output 380 may include the processed and equalized output signal derived from the content source 370.

Modifications, additions, or omissions may be made to the system 300 without departing from the scope of the present disclosure. For example, the system 300 may include more or fewer components than those illustrated in FIG. 3. For example, any number of variable resistors 354 may be disposed at various locations throughout the object. As another example, the system 300 may include multiple pressure sensors 350 associated with multiple transducers 312 that may be monitored by one processor 316 or multiple microcontrollers 316.

Figure 4:
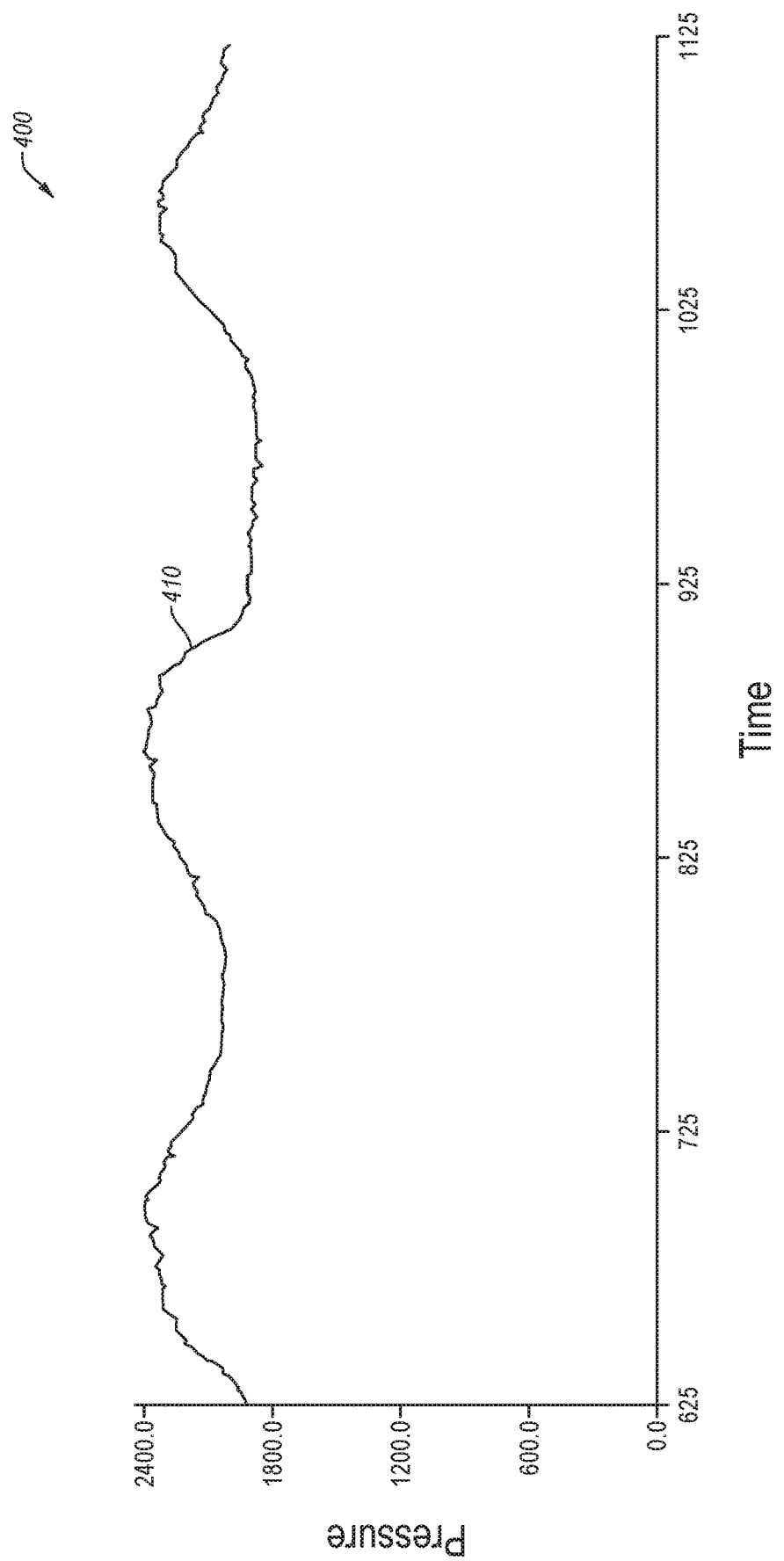
FIG. 4 illustrates an example graphical representation of readings from sensors.

FIG. 4 illustrates an example graphical representation 400 of readings from sensors, in accordance with one or more embodiments of the present disclosure. The graphical representation 400 may illustrate a plot of pressure vs time as measured by pressure sensors such as the pressure sensors 114 of FIG. 1, 214 of FIG. 2, and/or variations in resistance of the variable resistors 354 of FIG. 3.

As illustrated in FIG. 4, while used for determining a transducer system state, the pressure readings may also be used to monitor the breathing rate of a user using an object within which the transducer is disposed. For example, an automobile seat or backpack that is worn by a user that includes a transducer for providing tactile sensations and pressure sensors for determining the transducer system state associated with the transducers may also measure the breathing rate. A trace 410 illustrates the data points of the pressure over time. As illustrated in FIG. 4, the trace 410 may include a series of peaks and valleys. The peaks may represent an inhale, and the valleys may represent an exhale. For example, as the lungs expand with an inhale, the body of the user may exert more pressure on the object, and as the lungs contract with an exhale, the body of the user may exert less pressure on the object. A number of approaches may be used to determine the breathing rate based on the data of the pressure sensor, such as that described with reference to FIGS. 8-10.

Modifications, additions, or omissions may be made to the graphical representation 400 without departing from the scope of the present disclosure. For example, the graphical representation 400 may include more or fewer components than those illustrated in FIG. 4. For example, the pressure may be monitored and traced for any length of time.

Figure 5:
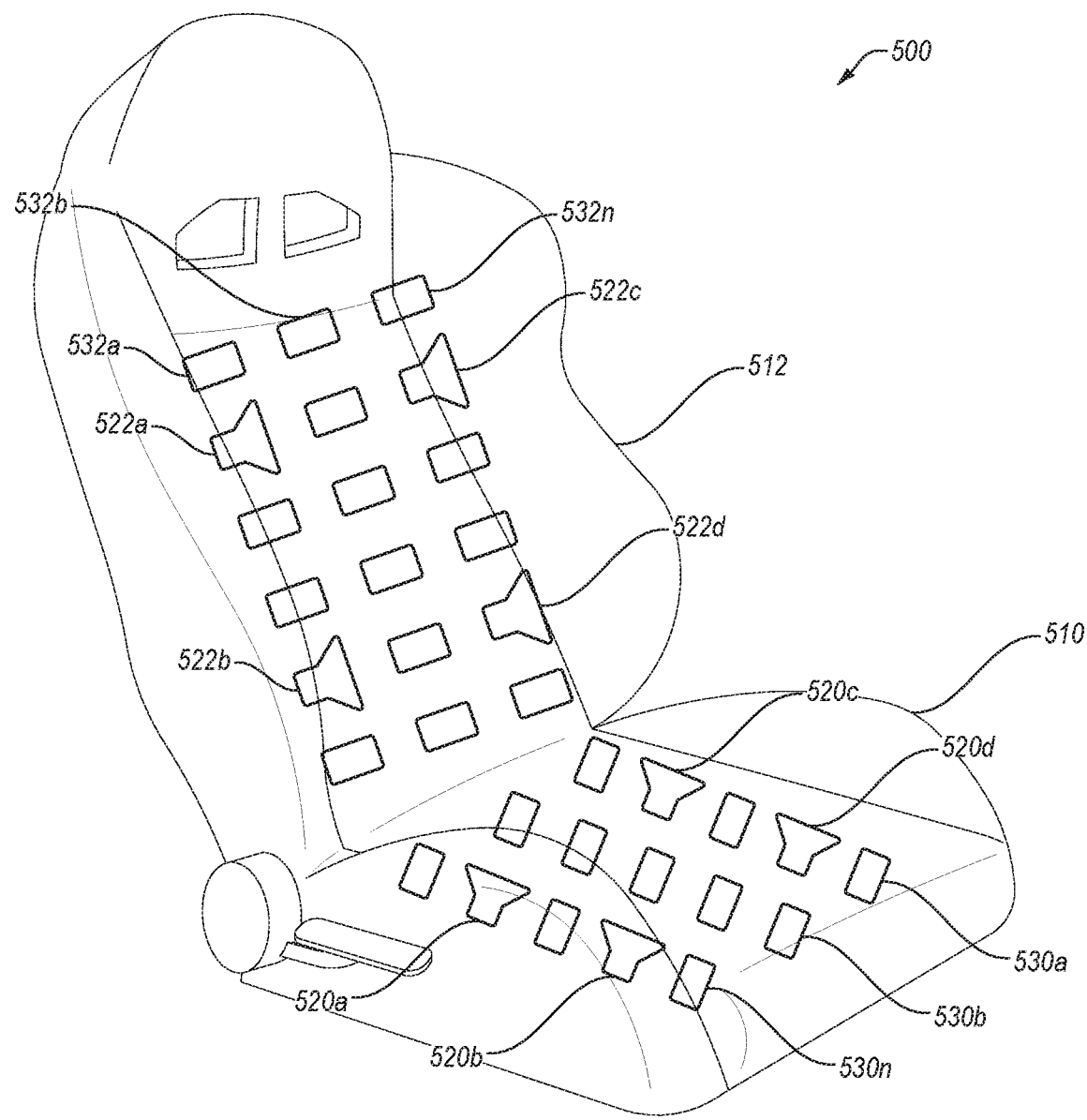
FIG. 5 illustrates an example automobile seat.

FIG. 5 illustrates an example automobile seat 500, in accordance with one or more embodiments of the present disclosure. The automobile seat 500 may use one or more transducers 520 in a seat portion 510 and/or one or more transducers 522 in a back portion 512 of the automobile seat 500 to provide tactile sensations to an occupant of the automobile seat 500. The automobile seat 500 may include pressure sensors 530 to facilitate determination of a transducer system state associated with the transducers 520 and/or pressure sensors 532 to facilitate determination of the transducer system states. The automobile seat 500 may be similar or comparable to the object 110 of FIG. 1 and/or the automobile seat 210 of FIG. 2. The transducers 520 and/or 522 may be similar or comparable to the transducers 112 of FIG. 1, 212 of FIG. 2, and/or 312 of FIG. 3. The pressure sensors 530 and/or 532 may be similar or comparable to the pressure sensors 114 of FIG. 1, 214 of FIG. 2, and/or 350 of FIG. 3 and/or the variable resistors 354 of FIG. 3.

In operation, the various pressure sensors 530/532 may be used to monitor the amount of pressure exerted on the automobile seat 500 by the occupant of the automobile seat 500. For example, the pressure sensors 530 may take readings of the amount of pressure exerted on the seat portion 510 by the occupant sitting on the seat portion 510, and the pressure sensors 532 may take readings of the amount of pressure exerted on the back portion 512 based on the occupant leaning back against the back portion 512. In these and other embodiments, the transducer system states associated with the transducers 520 in the seat portion 510 may be in a different transducer system state than the transducer system states associated with the transducers 522 in the back portion 512 due to the increased force applied when considering the force from the occupant sitting on the seat portion 510 as compared to leaning against the back portion 512. Certain combinations of pressure sensors 530 may be dedicated to a particular transducer 520, and/or combinations of pressure sensors 532 may be dedicated to a particular transducer 522.

In some embodiments, the transducers 520 and/or 522 may be activated in differing combinations and/or locations based on various triggering events. For example, a lane departure warning may trigger the transducers 520c, 520d, 522c, and 522d such that the transducers 520/522 along the left side may be activated. As another example, a rear passenger door ajar signal may trigger the transducers 522c and 522d.

In some embodiments, signals for various transducers may be modified or adjusted based on whether or not the occupant of the automobile seat 500 is on contact with the region of the automobile seat 500 over the various transducer. For example, the activating signal for the transducer 522a may typically generate a tactile sensation to the occupant of the automobile seat 500. When the pressure sensors 532 indicate that the occupant of the automobile seat 500 is not in contact with the back portion 512 over the transducer 532a, the activating signal for the transducer 532a may be modified such that the transducer 532a may produce an audible sound in addition to or instead of the tactile sensation. For example, the activating signal may include a low frequency component (e.g., between 10 and 250 Hz) to produce the tactile sensations and a high frequency component (e.g., between 500 and 30,000 Hz, between 800 and 9,000 Hz, between 2,000 Hz and 8,000 Hz, and/or around 3500 Hz) to produce the audible sound. In normal operation, the high frequency component may be filtered out. When the occupant is not in contact with the back portion 512 of the seat over the transducer 532a, the high frequency component may be unfiltered when sent to the transducer 532a. Additionally or alternatively, when the occupant is not in contact with the back portion 512 of the seat over the transducer 532a, the low frequency component may be filtered out while the high frequency component may be permitted to be sent to the transducer 352a.

In some embodiments, an entire array of transducers 520/522 may receive a modified signal based on one of the transducers in the array being associated with a location with which the occupant is not in contact. For example, if the transducers 520a, 520b, 522a, and 522b were associated with an alert of a triggering event, but the occupant of the automobile seat 500 is not in contact with the back portion 512 over the transducer 522a, rather than only changing the activating signal being sent to the transducer 522a, the activating signals being sent to the transducers 522a, 522b, 520a, and/or 520b may all be modified to produce an audible sound. In these and other embodiments, it may be less than all of the transducers in the array that are modified. For example, the activating signal for the transducer 522a and the next closest transducer, the transducer 522b, may be modified. Any number or combinations, in addition to the transducer 522a may be modified based on the occupant of the automobile seat 500 not being in contact with the back portion 512 associated with the transducer 522a.

Modifications, additions, or omissions may be made to the automobile seat 500 without departing from the scope of the present disclosure. For example, the automobile seat 500 may include more or fewer components than those illustrated in FIG. 5. For example, the automobile seat 500 may include any number of transducers 520/522 and/or pressure sensors 530/532.

Figure 6A:
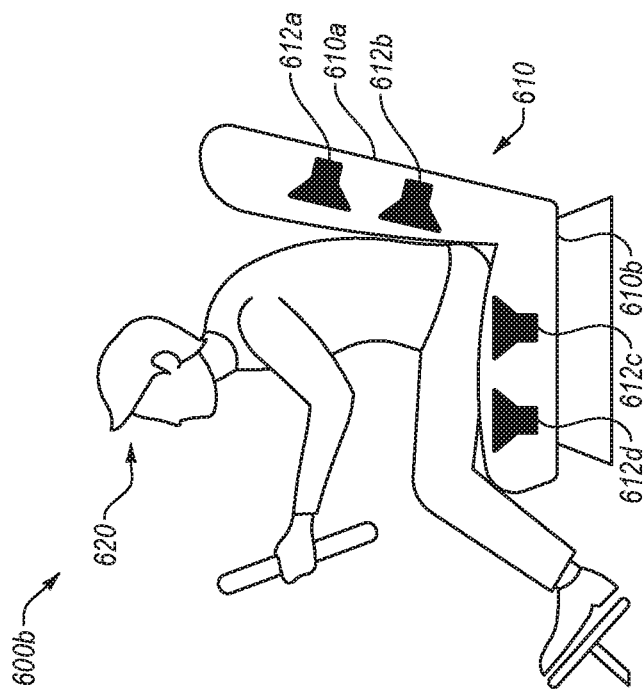
FIGS. 6A and 6B illustrate examples views of an occupant in an automobile seat.
Figure 6B:
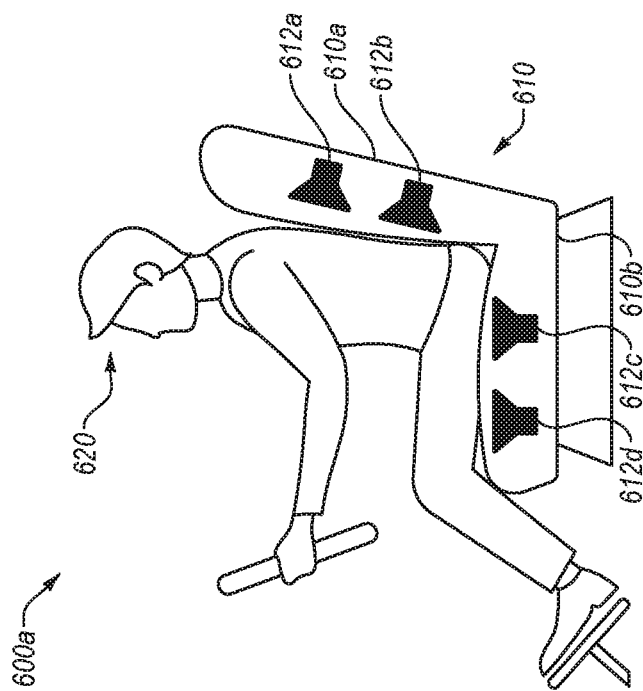

FIGS. 6A and 6B illustrate examples views 600a and 600b of an occupant 620 in an automobile seat 610, in accordance with one or more embodiments of the present disclosure. The view 600a illustrates the occupant 620 sitting with an erect posture and the view 600b illustrates the occupant 620 sitting with a slouching posture.

The automobile seat 610 may include a back portion 610a and a seat portion 610b. The back portion 610a may include transducers 612a and 612b and the seat portion 610b may include transducers 612c and 612d. The automobile seat 610 may be similar or comparable to the automobile seat 210 of FIG. 2 and/or the automobile seat 500 of FIG. 5, the transducers 612 may be similar or comparable to the transducers 112 of FIG. 1, 212 of FIG. 2, 312 of FIG. 3, and 520/522 of FIG. 5.

During operation, an activating signal may be sent to the transducer 612a based on a triggering event. In some circumstances, if it is determined that the occupant 620 is not sitting against the back portion 610a with an erect posture such that the occupant is not sitting against the back portion over the transducer 612a, the activating signal may be sent to a different transducer, such as the transducer 612b. However, doing so may cause confusion to the occupant 620 as the location of the expected tactile sensation may occur at the location of the transducer 612b rather than the transducer 612a. This may be particularly dangerous or disadvantageous when the triggering event has a directionality component. For example, if the transducer 612a were on the left side of the automobile seat 610 and the transducer 612b were on the right side of the automobile seat 610, the occupant 620 may think the triggering event is coming from the opposite direction than intended.

In some embodiments, when the occupant 620 is not sitting against the transducer 612a and the transducer 612a is to receive an activating signal, the activating signal may be changed to produce an audible sound. In these and other embodiments, by maintaining the location within the automobile seat 610 of the alert, the occupant may continue to maintain a sense of the directionality component of the triggering event.

In some embodiments, the change in posture observed when comparing view 600a to the view 600b may occur in the middle of an alert from a triggering event. In these and other embodiments, the activating signal may be modified in real time, or in other words, part way through presenting the alert to the occupant 620. For example, just as the pressure sensors facilitate determination of a transducer system state associated with the transducers 612 in real time and may modify the equalization applied to an output signal in real time, the activation signal may also be modified. For example, the filtering to select a low frequency component rather than a high frequency component for the activating signal for a transducer 612 during the posture as illustrated in the view 600a may be changed such that the high frequency component of the activating signal is no longer filtered when the occupant 620 shifts to the posture illustrated in the view 600b.

Modifications, additions, or omissions may be made to the views 600a/600b without departing from the scope of the present disclosure. For example, the occupant may shift their posture such that their legs may not be in contact with the seat portion 610b over certain transducers 612. As another example, any number of transducers in any locations in the automobile seat 610 are contemplated, and any number of pressure sensors associated therewith (not illustrated) are contemplated.

Figure 7:
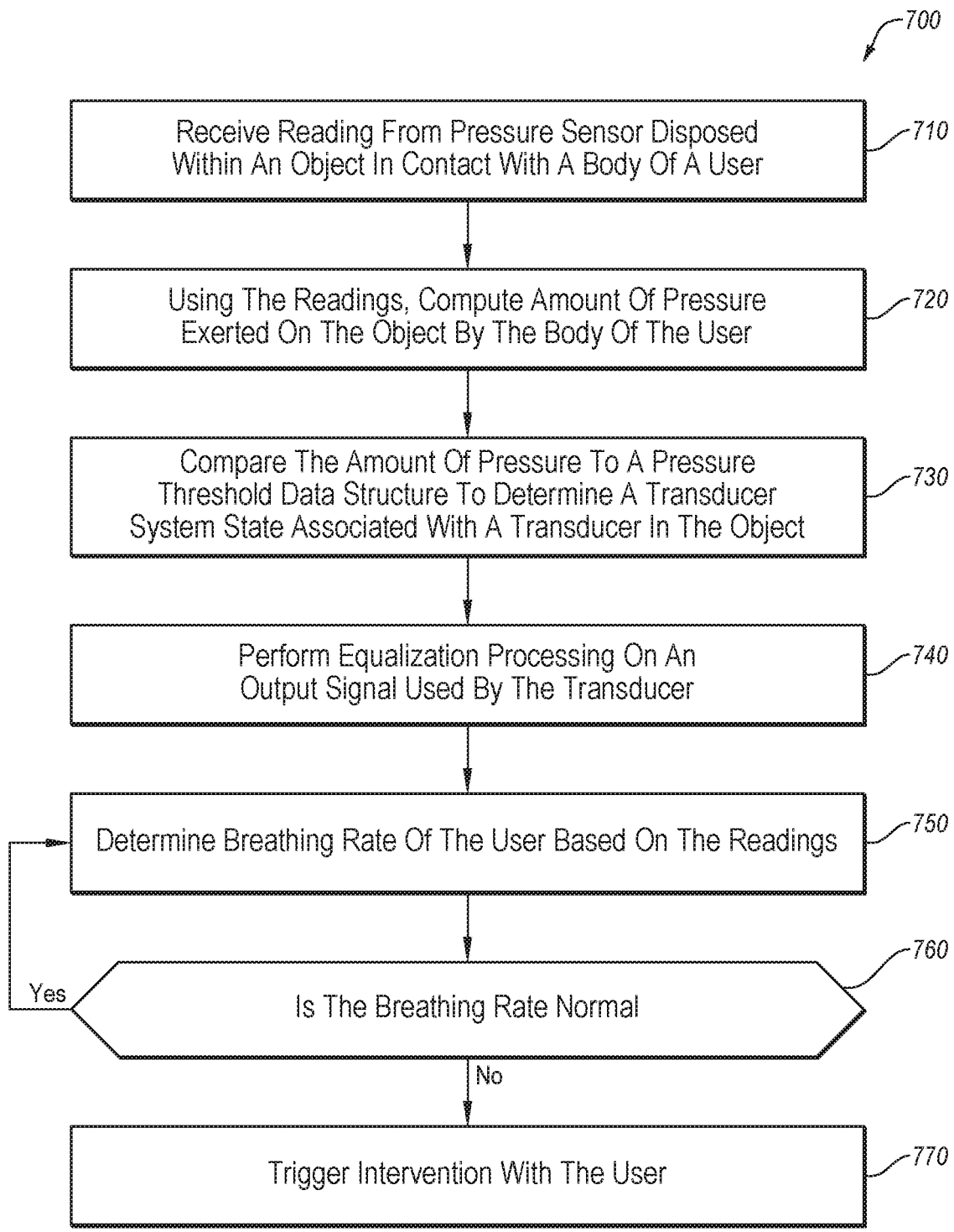
FIG. 7 illustrates a flowchart of an example method of providing contextual equalization.

FIG. 7 illustrates a flowchart of an example method 700 of providing contextual equalization, in accordance with one or more embodiments of the present disclosure. One or more operations of the method 700 may be performed by a system or device, or combinations thereof, such as the system 100, the object 110, and/or the processor 116 of FIG. 1; the vehicle 200 of FIG. 2; and/or the system 300, and/or the processor 316 of FIG. 3. Although illustrated as discrete blocks, various blocks of the method 700 may be divided into additional blocks, combined into fewer blocks, or eliminated, depending on the desired implementation.

At block 710, a pressure sensor reading may be received from a pressure sensor disposed within an object in contact with a body of a user. For example, a pressure sensor may be disposed within a backpack or other wearable device that is configured to provide tactile sensations to the body of the user via one or more transducers. As another example, a pressure sensor may be disposed within a seat that is configured to provide tactile sensations to the body of the occupant of the seat via one or more transducers. In some embodiments, the pressure sensor may include an FSR. In some embodiments, the pressure sensor may be configured as illustrated in FIG. 3.

At block 720, an amount of pressure exerted on the object by the body of the user may be computed using the readings of the block 710. For example, a microcontroller or processor may be configured to calculate a pressure value based on the readings from the pressure sensor. In some embodiments, one or more calculations may be performed on the resistance and/or conductance levels as read by the pressure sensor to determine a conductance of the FSRs. Based on the readings, an amount of pressure experienced in the system may be determined.

At block 730, the amount of pressure may be compared to a pressure threshold data structure to determine a transducer system state associated with the transducer in the object. For example, the resistance of the variable resistor may be correlated with a pressure value, and the pressure value may be correlated with a particular state of the transducer. An example pressure threshold data structure is included below:

| Resistance Range | Pressure Value | Transducer System State | Equalization Curve |
|---|---|---|---|
| Very large (e.g., greater than 10 MΩ)—10 kΩ | Minimal/zero | State A—no contact with object | Curve A |
| 10 kΩ—3 kΩ | Low pressure | State B—light contact with object | Curve B |
| 3 kΩ—1Ω | Moderate pressure | State C—medium contact with object | Curve C |
| ... | ... | ... | ... |

Additionally or alternatively, a function may be applied to the resistance values to generate the equalization curve in a continuous manner. For example, a linear or logarithmic correlation between the resistance and the amplitude values may be generated. In some embodiments, different frequency bands may follow different linear or logarithmic correlation between the resistance and the amplitude values for the different frequency bands.

At block 740, equalization processing may be performed on an output signal used by the transducer that is specific to the transducer system state associated with the transducer. For example, based on the transducer system state as determined in the block 730, a particular equalization curve may be applied to an output signal being provided to the transducer. In these and other embodiments, the equalization may include an amplitude modifier of zero such that a transducer is muted if in a "no contact" transducer system state. In these and other embodiments, such equalization may be accomplished by filtering, cancelling, or otherwise preventing the output signal from being provided to the transducer associated with the "no contact" state.

At block 750, a breathing rate of the user may be determined based on the pressure readings. For example, a trace of the pressure readings may be stored over time and the occurrence of the different breaths may be determined for a given period of time. Various examples of doing so may be illustrated in FIGS. 8-10.

At block 760, a determination may be made whether or not the breathing rate is abnormal. For example, the breathing rate may be compared to typical breathing rates for individuals with a similar demographic as the user. As another example, the breathing rate for the user may be stored over time and based on the breathing rate falling outside of a normal range, the breathing rate may be identified as abnormal. If the breathing rate is not abnormal, the method 700 may return to block 750 to continue to determine the breathing rate of the user. If the breathing rate is abnormal, the method 700 may proceed to the block 770.

At block 770, an intervention may be triggered with the user based on the abnormal breathing rate. For example, the intervention may be a triggering event causing a certain pattern or duration of tactile sensation may be provided to the user to prompt the user to adjust their breathing rate. As another example, a signal may be sent to an electronic device of the user to cause the electronic device to provide the user with training or instruction on changing the breathing rate for the user.

Modifications, additions, or omissions may be made to the method 700 without departing from the scope of the disclosure. For example, the operations of the method 700 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 8:
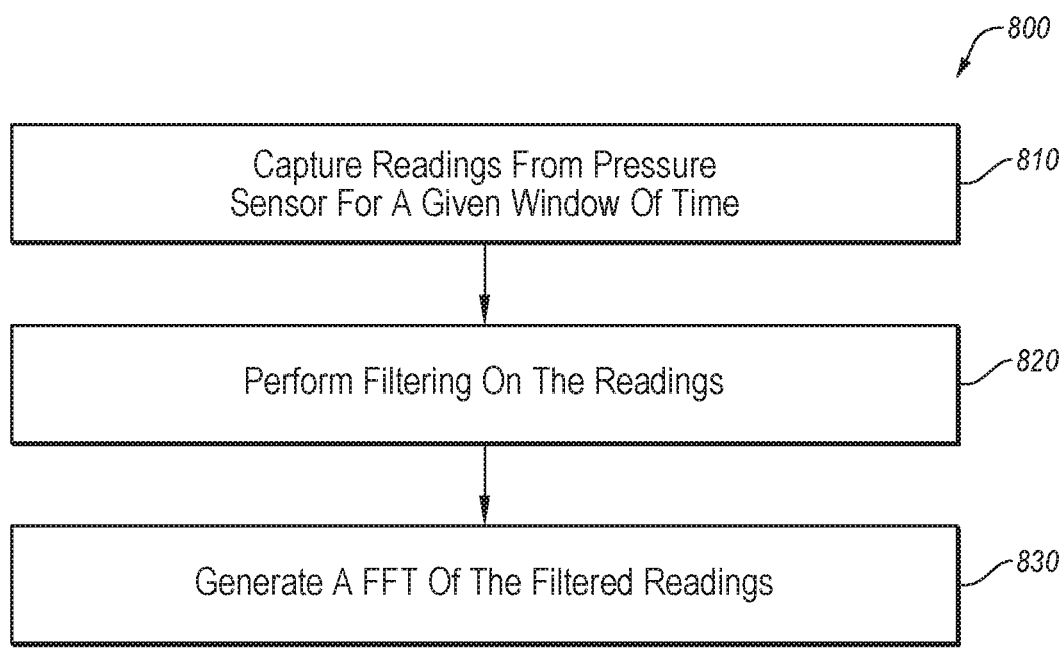
FIG. 8 illustrates a flowchart of an example method of determining a breathing rate.
Figure 9:
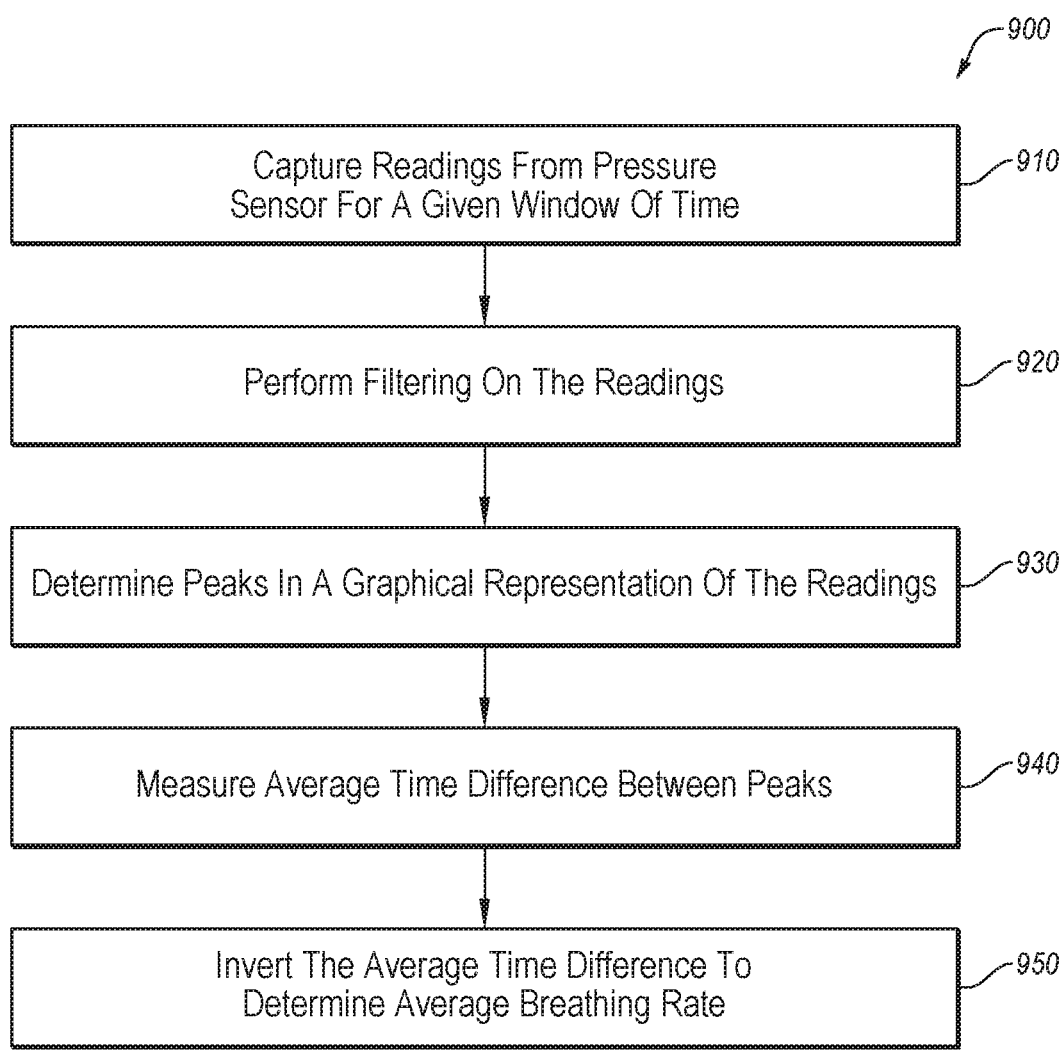
FIG. 9 illustrates a flowchart of another example method of determining a breathing rate.
Figure 10:
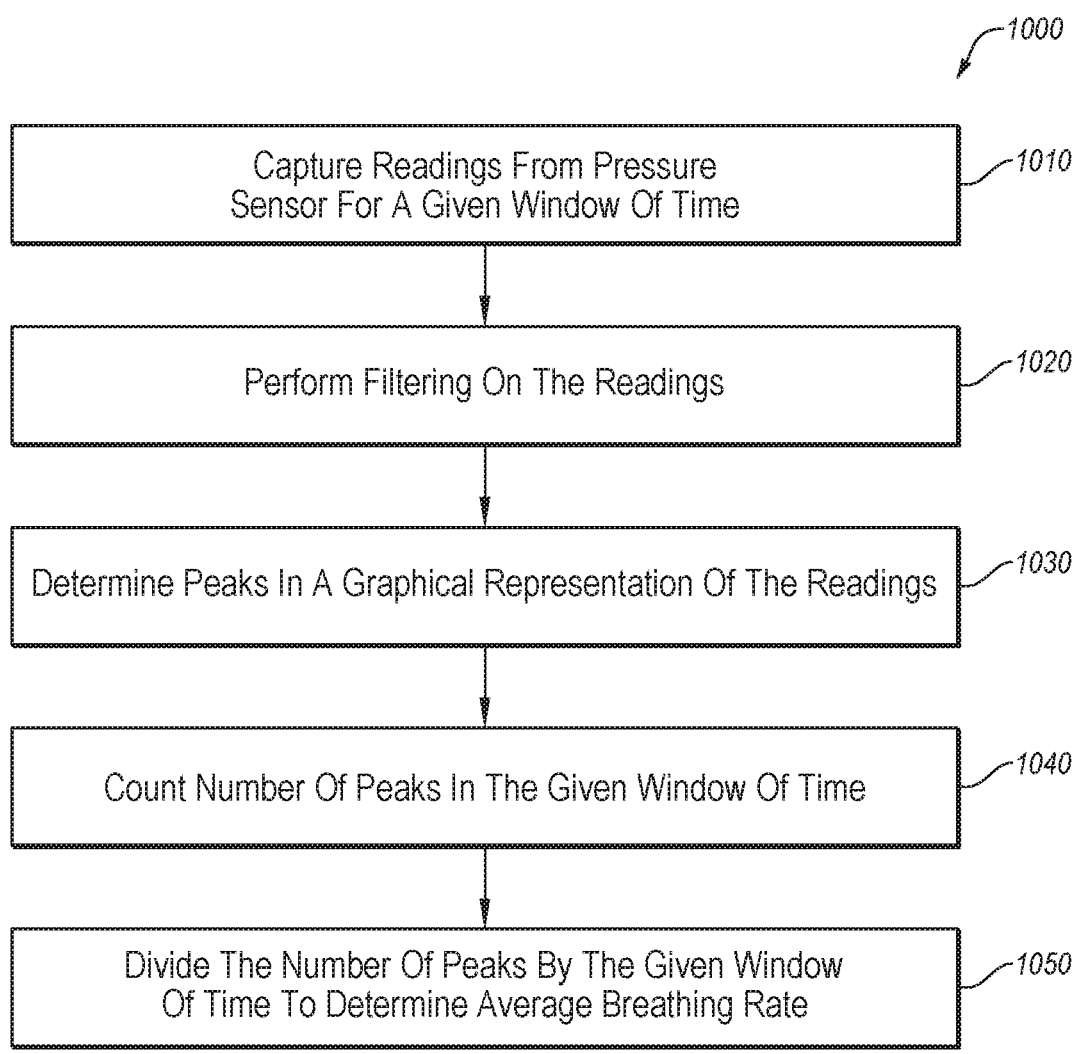
FIG. 10 illustrates a flowchart of an additional example method of determining a breathing rate.

FIGS. 8-10 illustrate flowcharts of example methods 800, 900, and 1000, respectively, of determining a breathing rate, in accordance with one or more embodiments of the present disclosure. The methods 800, 900, and 1000 may represent examples of specific implementations of the block 750 of FIG. 7. One or more operations of the methods 800, 900, and/or 1000, may be performed by a system or device, or combinations thereof, such as the system 100, the object 110, and/or the processor 116 of FIG. 1; the vehicle 200 of FIG. 2; and/or the system 300, and/or the processor 316 of FIG. 3. Although illustrated as discrete blocks, various blocks of the methods 800, 900, and/or 1000 may be divided into additional blocks, combined into fewer blocks, or eliminated, depending on the desired implementation.

With respect to the method 800, at block 810, readings from a pressure sensor may be captured for a given window of time. For example, the pressure readings may be captured at a frequency of between five and fifty times per second, between ten and thirty times per second, and/or around ten times per second. The readings may be used to generate a visual reproduction of the readings over time.

At block 820, filtering may be performed on the readings. For example, the incoming signals may be subjected to a low pass filter to remove noise and/or a high pass filter to remove drift in the signal. Other filtering may also be performed on the readings, such as amplification, normalization, correction, etc.

At block 830, a Fast Fourier Transform (FFT) may be generated based on the filtered readings. Because the FFT captures the frequency of the signals of the breathing (which, as observed in FIG. 4, may be a signal similar or comparable to a sine wave), the frequency with the highest amplitude in the FFT may represent the breathing rate of the user. While an FFT is described, any other processing or data analysis technique to determine a frequency response of a signal may be used.

With respect to the method 900, at block 910, readings from a pressure sensor may be captured for a given window of time. The block 910 may be similar or comparable to the block 810 of FIG. 8.

At block 920, filtering may be performed on the readings. The block 920 may be similar or comparable to the block 820 of FIG. 8.

At block 930, peaks in a graphical representation of the readings may be determined. For example, a series of local maximums may be found during the given window of time. The time of the peaks may be identified.

At block 940, the average time difference between peaks may be measured. For example, the time difference between each of the identified peaks may be found, and the average of the time differences may be taken.

At block 950, the average time difference of the block 940 may be inverted to determine the average breathing rate.

With reference to the method 1000, at block 1010, readings from a pressure sensor may be captured for a given window of time. The block 1010 may be similar or comparable to the block 810 of FIG. 8.

At block 1020, filtering may be performed on the readings. The block 1020 may be similar or comparable to the block 820 of FIG. 8.

At block 1030, peaks in a graphical representation of the readings may be determined. The block 1030 may be similar or comparable to the block 930 of FIG. 9.

At block 1040, a number of peaks in the given window of time may be counted. For example, the number of local maximums that occurred during the window of time may be tallied.

At block 1050, the number of peaks may be divided by the given window of time to determine an average breathing rate. For example, the number of peaks as determined in the block 1040 may be divided by the given time window for which the signals were collected in the block 1010.

Modifications, additions, or omissions may be made to the methods 800, 900, and/or 1000 without departing from the scope of the disclosure. For example, the operations of the method 800, 900, and/or 1000 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 11:
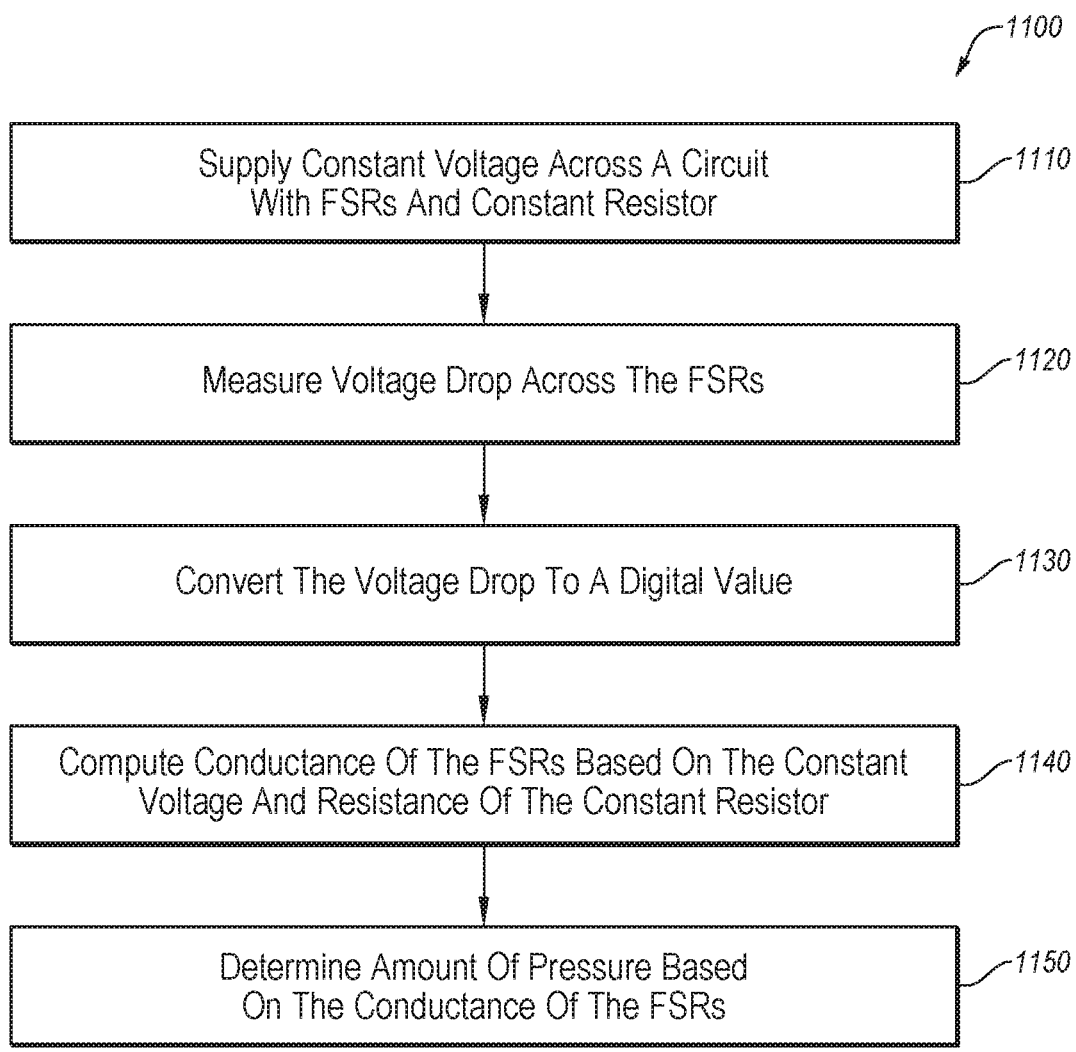
FIG. 11 illustrates a flowchart of an example method of determining an amount of pressure.

FIG. 11 illustrates a flowchart of an example method 1100 of determining an amount of pressure, in accordance with one or more embodiments of the present disclosure. One or more operations of the method 1100, may be performed by a system or device, or combinations thereof, such as the system 100, the object 110, and/or the processor 116 of FIG. 1; the vehicle 200 of FIG. 2; and/or the system 300, and/or the processor 316 of FIG. 3. Although illustrated as discrete blocks, various blocks of the method 1100 may be divided into additional blocks, combined into fewer blocks, or eliminated, depending on the desired implementation.

At block 1110, a constant voltage may be supplied across a circuit with FSRs and a constant resistor. An example of such a circuit is illustrated in FIG. 3. Such a circuit may include a voltage divider circuit with a constant resistor in one branch of the voltage divider circuit and a set of FSRs in parallel in the other branch of the circuit.

At block 1120, the voltage drop across the FSRs may be measured. For example, the voltage between the two branches may be measured and the voltage at the branch as compared to the ground may represent the voltage drop across the FSRs.

At block 1130, the voltage drop may be converted to a digital value. For example a DAQ may convert the reading of the voltage drop into a digital value that may be used by a microcontroller or processor.

At block 1140, conductance of the FSRs may be computed based on the constant voltage and the resistance of the constant resistor. For example, the conductance may be computed based on the equation of $$V_r = V_{dd}\left(\frac{R_{constant}}{(R_{FSR1} + R_{FSR2} + \ldots + R_{FSRn}) + R_{constant}}\right)$$

and solving for the summation of the variable resistors, where $V_{dd}$ may represent the source voltage, and $V_r$ may represent the voltage as measured in the circuit between the branch containing the variable resistors $R_{FSR}$ and the branch containing the constant resistor $R_{constant}$. The inverse of the resistance of the variable resistors $R_{FSR}$ may be the conductance of the FSRs.

At block 1150, an amount of pressure may be determined based on the conductance of the FSRs. For example, the conductance and/or resistance as determined at the block 1140 may be compared to a pressure threshold data structure to determine a corresponding amount of pressure.

Modifications, additions, or omissions may be made to the method 1100 without departing from the scope of the disclosure. For example, the operations of the method 1100 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 12:
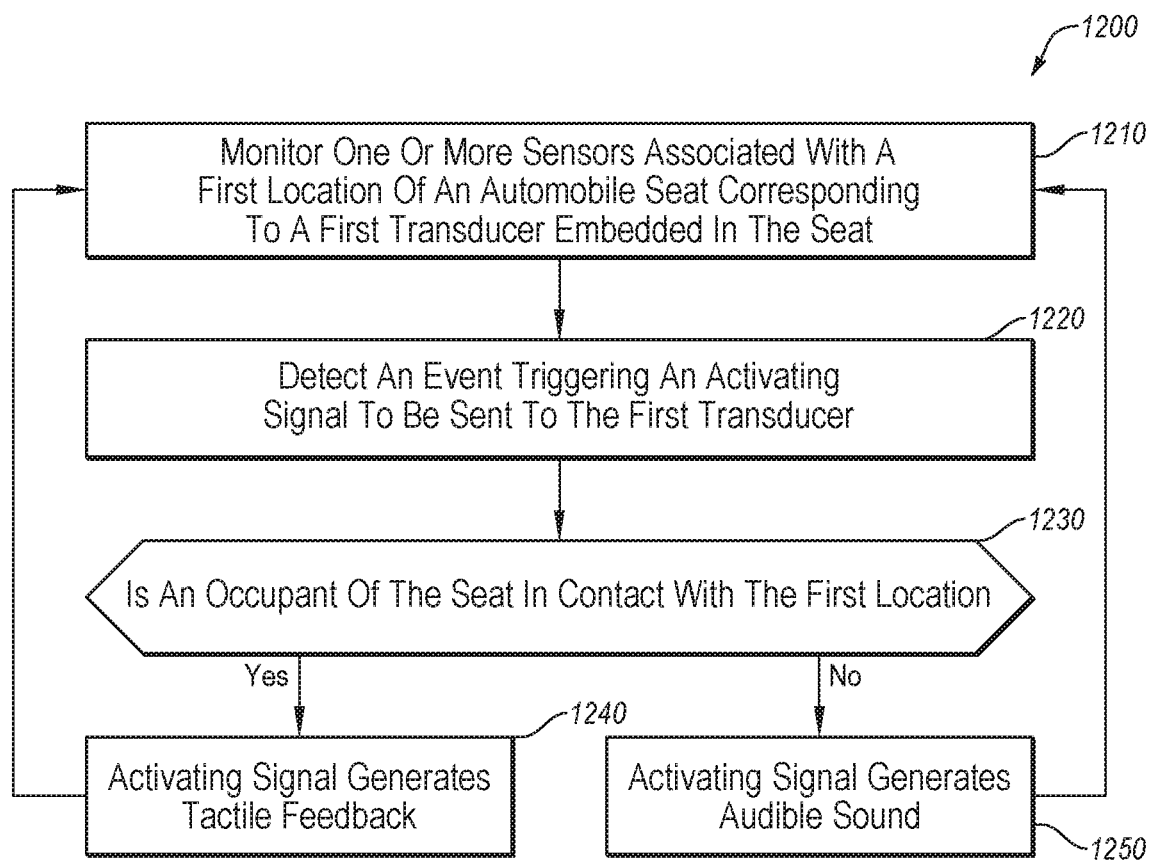
FIG. 12 illustrates a flowchart of an example method of determining an amount of pressure.

FIG. 12 illustrates a flowchart of an example method of determining an amount of pressure, in accordance with one or more embodiments of the present disclosure. One or more operations of the method 1200, may be performed by a system or device, or combinations thereof, such as the system 100, the object 110, and/or the processor 116 of FIG. 1; the vehicle 200 of FIG. 2; and/or the system 300, and/or the processor 316 of FIG. 3. Although illustrated as discrete blocks, various blocks of the method 1200 may be divided into additional blocks, combined into fewer blocks, or eliminated, depending on the desired implementation.

At block 1210, one or more sensors associated with a first location of an automobile seat corresponding to a first transducer embedded in the seat may be monitored. For example, a transducer embedded within the automobile seat may have one or more pressure sensors dedicated to the transducer to facilitate determination of a transducer system state. The pressure sensors may also be embedded within the automobile seat proximate the transducer. In these and other embodiments, the pressure sensors may work in cooperation to determine the transducer system state associated with the first transducer corresponding to the first location on the automobile seat. The first location may be a surface of the automobile seat directly over where the first transducer is embedded in the automobile seat. In addition to a pressure sensor, other sensors may be used, such as a camera, a thermocouple, an accelerometer, etc. to facilitate monitoring of the first location.

At block 1220, an event triggering an activating signal to be sent to the first transducer may be detected. For example, any of an ADAS alert, a lane departure warning, a door ajar signal, etc. may be the triggering event that is detected. In these and other embodiments, a processor associated with the automobile may detect the event and send the activating signal to the first transducer with certain accompanying processing. In some embodiments, the processing may include filtering out of certain components of the activating signal, such as a high frequency component and/or a low frequency component of the activating signal.

At block 1230, a determination may be made whether or not an occupant of the automobile seat is in contact with the first location. For example, based on compression of the foam and/or other material of which the automobile seat is made being compressed around the first location, the readings of a pressure sensors may change indicating that there is contact with a body of the occupant and the first location. As another example, a thermocouple may facilitate measuring a temperature at or near the first location. If the temperature is elevated above the ambient temperature, it may be determined that the occupant is in contact with the first location. As an additional example, an accelerometer may measure movement near the first location such that as the accelerometer moves due to compression of the automobile seat, a determination may be made that the occupant is in contact with the first location due to movement of the surface of the automobile seat at the first location. As an additional example, a camera may capture an image, such as the views illustrated in FIGS. 6A and 6B, the analysis of which may indicate whether or not the occupant is in contact with the first location. If it is determined that the occupant is in contact with the automobile seat at the first location, the method 1200 may proceed to the block 1240. If it is determined that the occupant is not in contact with the automobile seat at the first location, the method 1200 may proceed to the block 1250.

At block 1240, the activating signal may be provided to the transducer such that the transducer generates tactile feedback. For example, the activating signal may be provided with normal operation, such as by using typical filtering because the occupant is in contact with the first location. In these and other embodiments, the activating signal may include a high frequency component and a low frequency component and the high frequency component may be filtered out at the block 1240 prior to sending the activating signal to the first transducer. After providing the tactile feedback to the occupant of the automobile seat at block 1240, the method 1200 may return to the block 1210.

At block 1250, the activating signal may be provided to the transducer such that the transducer generates an audible sound based on the occupant not being in contact with the first location. For example, the filtering that removes the high frequency component from the activating signal may be bypassed at the block 1250. In some embodiments, both a tactile sensation and an audible sound may be generated by the activating signal at the block 1250. In some embodiments, the occupant may shift so that they are in contact with the first location part-way through the activating signal. In these and other embodiments, the method 1200 may transition from providing an audible sound or a tactile response and an audible sound, to longer producing the audible sound when it is detected that the occupant is in contact with the first location. Additionally or alternatively, if starting with a tactile response and detecting that the occupant is no longer in contact with the first location, the activating signal may be modified to produce an audible sound partway through the reproduction of the activating signal. After the block 1250, the method 1200 may return to the block 1210 to continue to monitor the sensors associated with the first location.

Modifications, additions, or omissions may be made to the method 1200 without departing from the scope of the disclosure. For example, the operations of the method 1200 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

The methods 600, 700, 800, 900, and 1000 may be performed, in whole or in part, in some embodiments in a network environment, such as the environment 400. Additionally or alternatively, the methods 600, 700, 800, 900, and 1000 may be performed by a processor, such as a processor of the server 410, as described with respect to FIGS. 4 and 5. In these and other embodiments, some or all of the steps of the methods 600, 700, 800, 900, and 1000 may be performed based on the execution of instructions stored on one or more non-transitory computer-readable media.

According to this disclosure, generally, a processor may include any suitable special-purpose or general-purpose computer, computing entity, or processing device including various computer hardware or software modules and may be configured to execute instructions stored on any applicable computer-readable storage media. For example, the processor may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

It is understood that the processor may include any number of processors distributed across any number of networks or physical locations that may be configured to perform individually or collectively any number of operations described herein. In some embodiments, the processor may interpret and/or execute program instructions and/or processing data stored in the memory. By interpreting and/or executing program instructions and/or process data stored in the memory, the device may perform operations, such as the operations performed by a processor of the server 410, as described with respect to FIGS. 4 and 5.

Further, according to the present disclosure, memory as found in servers, databases, and the like may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. In these and other embodiments, the term "non-transitory" as used herein should be construed to exclude only those types of transitory media that were found to fall outside the scope of patentable subject matter in the Federal Circuit decision of *In re Nuuten*, 500 F.3d 1346 (Fed. Cir. 2007). In some embodiments, computer-executable instructions may include, for example, instructions and data configured to cause the processor to perform a certain operation or group of operations as described in the present disclosure.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. The drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.). The terms "about" and "approximately" may be interpreted as less than or equal to 10% (percent) of actual value or another percentage as understood by one with skill in the art.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
   monitoring a sensor associated with a first location of an automobile seat, the first location corresponding to a first transducer embedded within the automobile seat, the automobile seat also including a second transducer at a second location within the automobile seat, the first and the second transducers configured to generate tactile feedback upon receiving an activating signal;
   detecting an event triggering the activating signal to be sent to the first transducer; and
   based on a reading from the sensor indicating that an occupant of the automobile seat is not in contact with the first location, modifying the activating signal such that the first transducer primarily produces an audible sound rather than tactile feedback.

2. The method of claim 1, wherein the event includes a directionality component and the activating signal is sent to the first transducer rather than the second transducer based on the directionality component corresponding to the first location rather than the second location.

3. The method of claim 1, wherein the first location is in a back portion of the automobile seat and the second location is in a seat portion of the automobile seat.

4. The method of claim 1, wherein the first location is on a left side of the automobile seat and the second location is on a right side of the automobile seat.

5. The method of claim 1, further comprising:
   monitoring a second sensor associated with the second transducer at the second location;
   wherein the modification of the activating signal is based on a reading from the second sensor and the reading from the sensor.

6. The method of claim 1, wherein the sensor includes a pressure sensor and monitoring the sensor includes:
   receiving a reading from the pressure sensor, the pressure sensor including a force sensitive resistor (FSR) in series with a constant resistor;
   using the reading from the pressure sensor, computing an amount of pressure exerted on the automobile seat by the occupant of the automobile seat; and
   comparing the amount of pressure to a pressure threshold data structure to determine whether or not the occupant is in contact with the first location.

7. The method of claim 1, wherein the sensor includes at least one of an accelerometer, a thermocouple, and a camera.

8. The method of claim 1, wherein modifying the activating signal includes passing the activating signal through a high-pass filter that filters out frequencies below approximately 100 hertz (Hz).

9. The method of claim 1, wherein modifying the activating signal includes skipping the activating signal passing through a low-pass filter that filters out frequencies above approximately 100 Hz.

10. The method of claim 1, wherein the activating signal includes both a low frequency component between approximately 10-250 Hz and a high frequency component between approximately 250 Hz-20 kHz.

11. The method of claim 1, wherein the indication that the occupant is not in contact with the first location occurs partway through the first transducer being activated by the activating signal such that the activating signal causes primarily tactile feedback before the indication that the occupant is not in contact with the first location, followed by the activating signal causing primarily audible sound after the indication that the occupant is not in contact with the first location.

12. A vehicle, comprising:
    an automobile seat, the automobile seat including:
      a first transducer at a first location; and
      a second transducer at a second location, the first and the second transducers configured to generate tactile feedback upon receiving an activating signal;
    a sensor configured to monitor whether or not an occupant of the automobile seat is in contact with the first location; and
    a processor configured to perform one or more operations, the operations including:
      receiving indication of a triggering event;
      in response to the indication, determining the activating signal is to be sent to the first transducer; and
      based on a reading from the sensor indicating that the occupant of the automobile seat is not in contact with the first location, modifying the activating signal such that the first transducer primarily produces an audible sound rather than tactile feedback.

13. The vehicle of claim 12, wherein the triggering event includes a directionality component and the activating signal is sent to the first transducer rather than the second transducer based on the directionality component corresponding to the first location rather than the second location.

14. The vehicle of claim 12, wherein the first location is in a back portion of the automobile seat and the second location is in a seat portion of the automobile seat.

15. The vehicle of claim 12, wherein the first location is on a left side of the automobile seat and the second location is on a right side of the automobile seat.

16. The vehicle of claim 12, wherein the operations further comprise:
monitoring a second sensor associated with the second transducer at the second location;
wherein the modification of the activating signal is based on a reading from the second sensor and the reading from the sensor.

17. The vehicle of claim 12, wherein modifying the activating signal includes passing the activating signal through a high-pass filter that filters out frequencies below approximately 100 hertz (Hz).

18. The vehicle of claim 12, wherein modifying the activating signal includes skipping the activating signal passing through a low-pass filter that filters out frequencies above approximately 10 Hz.

19. The vehicle of claim 12, wherein the activating signal includes both a low frequency component between approximately 10-250 Hz and a high frequency component between approximately 250 Hz-20 kHz.

20. A vehicle, comprising:
an automobile seat, the automobile seat including multiple transducers including a first transducer at a first location, a second transducer at a second location, and a third transducer at a third location, each of the first, the second, and the third locations corresponding to left, central, and right regions, respectively of the automobile seat, each of the multiple transducers configured to move in response to receiving an activating signal; and
a plurality of sensors configured to monitor whether or not an occupant of the automobile seat is in contact with the first location, the second location, and the third location; and
a processor configured to perform one or more operations, the operations including:
receiving indication of a triggering event corresponding to a left side of the vehicle;
in response to the indication, determining the activating signal is to be sent to the first transducer at the first location in the left region of the automobile seat; and
based on a reading from at least one of the sensors indicating that the occupant of the automobile seat is not in contact with the first location, modifying the activating signal such that the first transducer produces both an audible sound and tactile feedback via motion of the first transducer.

* * * * *